July 7, 1936. J. LEDWINKA Re. 20,030

VEHICLE FRAME

Original Filed July 8, 1932 4 Sheets-Sheet 1

Inventor

Joseph Ledwinka

By John P. Darby

Attorney

July 7, 1936. J. LEDWINKA Re. 20,030
VEHICLE FRAME
Original Filed July 8, 1932 4 Sheets-Sheet 2
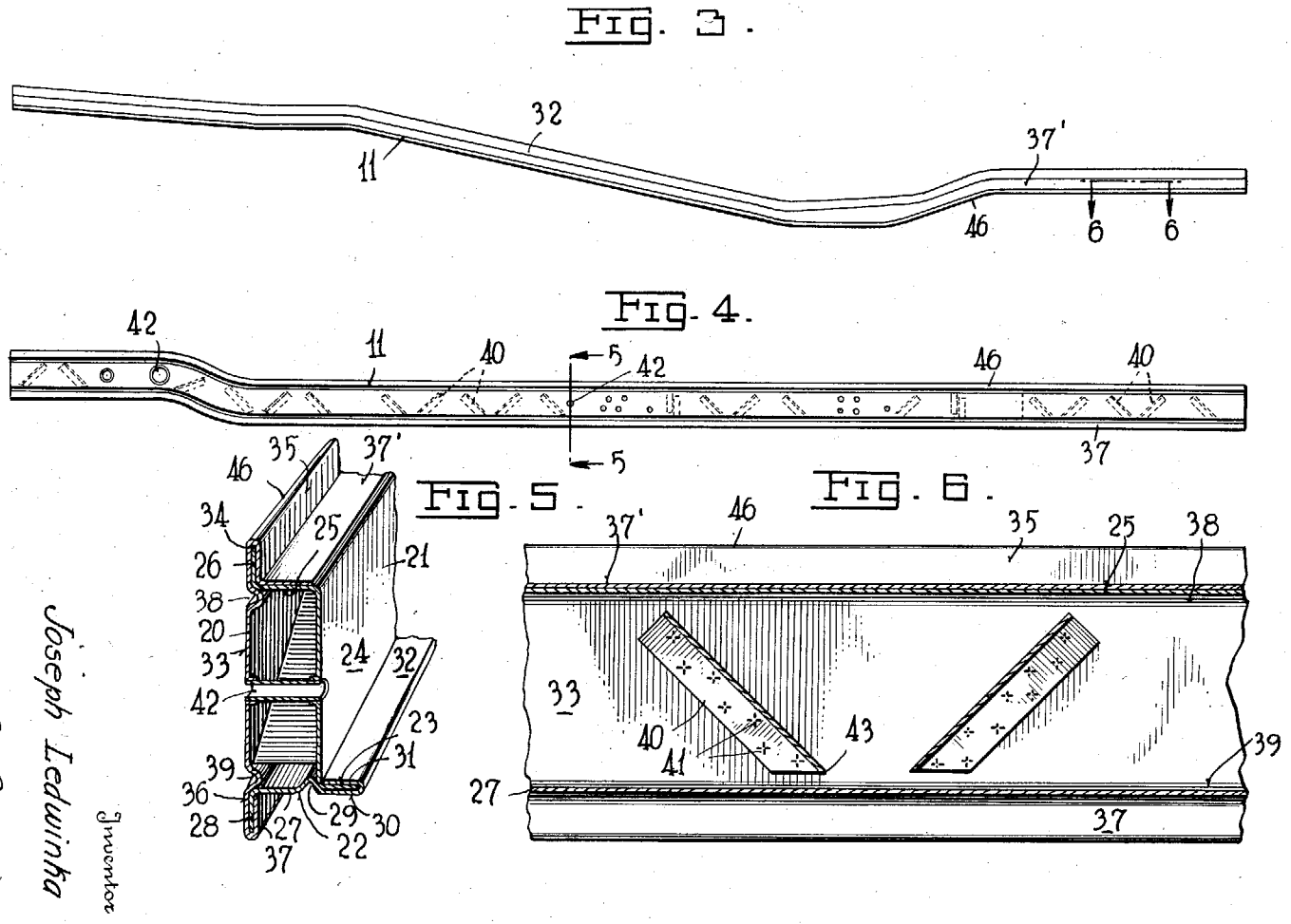
Inventor
Joseph Ledwinka
By John P. Parbst
Attorney July 7, 1936. J. LEDWINKA Re. 20,030

VEHICLE FRAME

Original Filed July 8, 1932 4 Sheets-Sheet 3

Inventor

Joseph Ledwinka

By John P. Darbo

Attorney

July 7, 1936. J. LEDWINKA Re. 20,030

VEHICLE FRAME

Original Filed July 8, 1932 4 Sheets-Sheet 4

Inventor

Joseph Ledwinka

By John P. Darbof

Attorney

Reissued July 7, 1936

Re. 20,030

UNITED STATES PATENT OFFICE 20,030

VEHICLE FRAME

Joseph Ledwinka, Philadelphia, Pa., assignor to Edward G. Budd Manufacturing Company, Philadelphia, Pa., a corporation of Pennsylvania Original No. 2,001,846, dated May 21, 1935, Serial No. 621,369, July 8, 1932. Application for reissue May 9, 1936, Serial No. 78,927

21 Claims. (Cl. 280—106)

My invention relates to sheet metal structural units and more particularly to such units arranged for fabrication into a vehicle chassis and more especially the sills. It also comprehends such a construction capable of producing a vehicle having a relatively low center of gravity and allowing substantially the elimination of the usual spring arrangement while providing a structure well adapted for use in connection with vehicles of the front wheel drive type.

It is especially desirable under modern requirements, to build automotive vehicles with relatively low center of gravity, while at the same time, to construct such vehicles with relatively great structural strengths and of very light weight. Inasmuch as vehicle speeds are rapidly increasing, the movable mass of the vehicle preferably should be commensurately reduced without inherently affecting the strength of the structure as a whole.

I accomplish the above desirable results and others incidental thereto by fabricating the chassis of relatively thin sheet metal stampings contoured to provide a body securing zone and making possible, the elimination, if desirable, of separate cross bracing for the vehicle body independently of the chassis structure. The chassis side sills are likewise offset vertically in such a manner as to allow the supported weight to be lower centrally of the chassis than would be possible with the sills longitudinally at all points within the same plane.

Another object of this invention is to construct in one unit, arranged for easy securement to the sills, means serving both as a spring and a shock absorber.

In the drawings, like ordinals represent correspoding parts in the various figures.

Fig. 3 shows a plan of my novel side sill contoured in complemental relation with the lowermost portions of the vehicle body;

Fig. 4 is a side elevation of the same sill showing the vertically displaced plural plane sections;

Fig. 5 is a sectional perspective view on an enlarged scale, substantially on the line 5—5 of Fig. 4;

Fig. 6 is a fragmentary sectional elevation on an enlarged scale, on the line 6—6 of Fig. 3;

Figure 1:
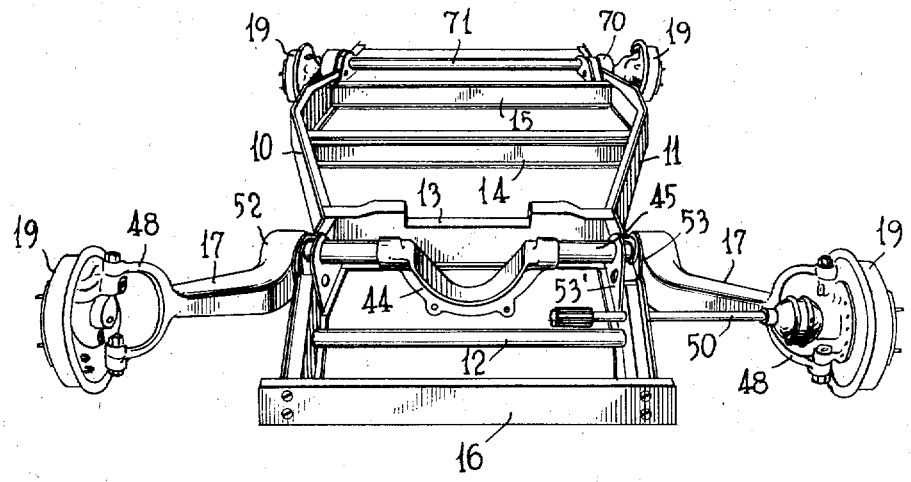
Fig. 1 is an end perspective view of a chassis incorporating advantageous features of my invention.

The vehicle chassis constructed in accordance with my invention consists primarily of the side sills 10 and 11, and a plurality of cross brace members of various sections, some being hollow tubular members 12, whereas others are hollow box section members 13, 14 and 15, and some may even be of channel or other suitable form 16, all of the said members being of relatively great strength and light weight. Some of the cross members may even combine the tubular with other section forms, as 44, which serves as a saddle for the engine, the tubular portions 45 at each side of the saddle, serving as bearings to receive trunnions attached to the wheel unit supporting arms, as hereinafter described. At each wheel, a wheel unit supporting arm of suitable form is used. As to the front wheels, this member is substantially as shown at 17 in Figures 7 and 8, whereas the rear wheels are of slightly modified form as indicated at 18. For purposes of clearness, the wheels are not shown, the central hub portions 19 thereof being the only part illustrated, except in Fig. 7.

The side sills 10 and 11 are substantially similar, the primary difference being that the variation in contour is generally laterally opposite in the two said sills. I construct the side sills of structural members fabricated from a plurality of sheet metal stampings 20, 21 and 22. The member 21 is substantially Z-shaped in section, having a vertical web portion 24 of relatively great depth forming one side wall of the sill or box section, an inwardly extending portion 23 at the bottom of the web, an outwardly extending portion 25 arranged to serve as the top wall of the box section, and a vertically disposed portion 26 forming an upwardly extending marginal flange.

The member 22 constitutes substantially the lower wall 27 of the box section and has a downwardly extending marginal flange 28 and a longitudinally extending rib 29 arranged to serve as a reinforcement for the side wall 24 at the lower edge thereof, the metal beyond such rib overlapping the portion 23 of the Z-section member as indicated at 30, and being reversely bent around and superposed upon said portion, as shown at 31, the metal parts 23, 30 and 31 thus forming a laterally and inwardly extending ledge 32 of multiple thickness and great strength, the three thicknesses together providing a rigid seat for the reception of the floor boards of the vehicle. Moreover, the rib 29 and portion 30 together form an inwardly and upwardly facing angular structure nesting with the lower angle of the Z-section, member, and the lower member 22 extends outwardly of the web 24 for substantially the width of said top wall portion 25.

The remaining or outer member 20 is formed of a sheet metal stamping having a central portion 33 serving as the outer side wall of the box section of the side sill and closing the channel formed by the other two members. This member 20 projects vertically upwardly and downwardly beyond the upper and lower walls of the box structure, and overlaps and is bent around the flanges 26 and 28, respectively, as indicated at 34, 35, and 37. Thus flanges 46 and 36 of multiple thickness are provided at the upper and lower outer edges of the side sill, such flanges lying in the same plane and substantially in the plane of the side wall 33. This materially adds strength and stiffness to the structure, and at the same time provides a secure anchorage for the connection of certain cross-members, as hereinafter described. The inner portion 35 of the upper flange is again bent and extended inwardly at 37′ to provide a complemental portion overlapping the laterally extending portion 25 of the member 21, thereby providing a double thickness upper wall to the box section. The lower flange of the stamping 20 does not extend laterally to provide a reinforcement as is provided at the upper edge of this member.

Additional strength is provided by longitudinally ribbing the member 20 at a plurality of points 38 and 39. This ribbing is adjacent the upper and lower corners of the box section, thereby giving a much greater strength to the member than it would otherwise have. Interiorly of the box section and diagonally disposed therein are a plurality of channel members 40. These members 40 are substantially alternately oppositely disposed and are spot welded, as at 41, to the adjacent side walls 24 and 33, providing interiorly thereof a substantially truss structure as well as a cross bond for the side walls at suitable spaced apart points along the side sill. Tubular members 42 of varying dimension for the reception of spindles, brake operating levers and other apparatus are used. Although not being indicated upon the drawings, the variously extending flanges may be spot welded for purposes of greater strength and more permanent securement throughout. The lowermost portions 43 of the diagonally disposed reinforcement members 40 are spaced from the web portion 27 of the stamping 22 a distance approximately equal to the width of the rib 39.

Whereas, for simplicity and convenience of description, the member 20 is referred to in the specification and claims as closing the channel formed by the other two members, it will, of course, be understood that in assembling the several members in actual practice, when diagonal bracing is used, the members 20 and 21 are first united, the diagonal bracing then introduced and welded in place, and the member 22 finally applied.

The side sill thus constructed provides a closed substantially rectangular box section with a plurality of different types of reinforcement greatly strengthening the section, and comprising a plurality of sheet metal stampings secured together throughout their edges exteriorly of the box section. Each and every one of these joint flanges preferably forms a continuation of an adjacent side wall and lies substantially in the plane thereof. The flange 32 serves as a supporting seat for the floor boards of the vehicles, whereas the flange 46 extends upwardly and being of complemental contour with the body is adapted for ready securement thereto. The double thickness upper wall 37′ formed by the angular relation of the flange 46 and the inwardly extending portion of member 20 serves as a support for the vehicle seats or any other internal structures normally arranged at this elevational plane.

Figure 7:
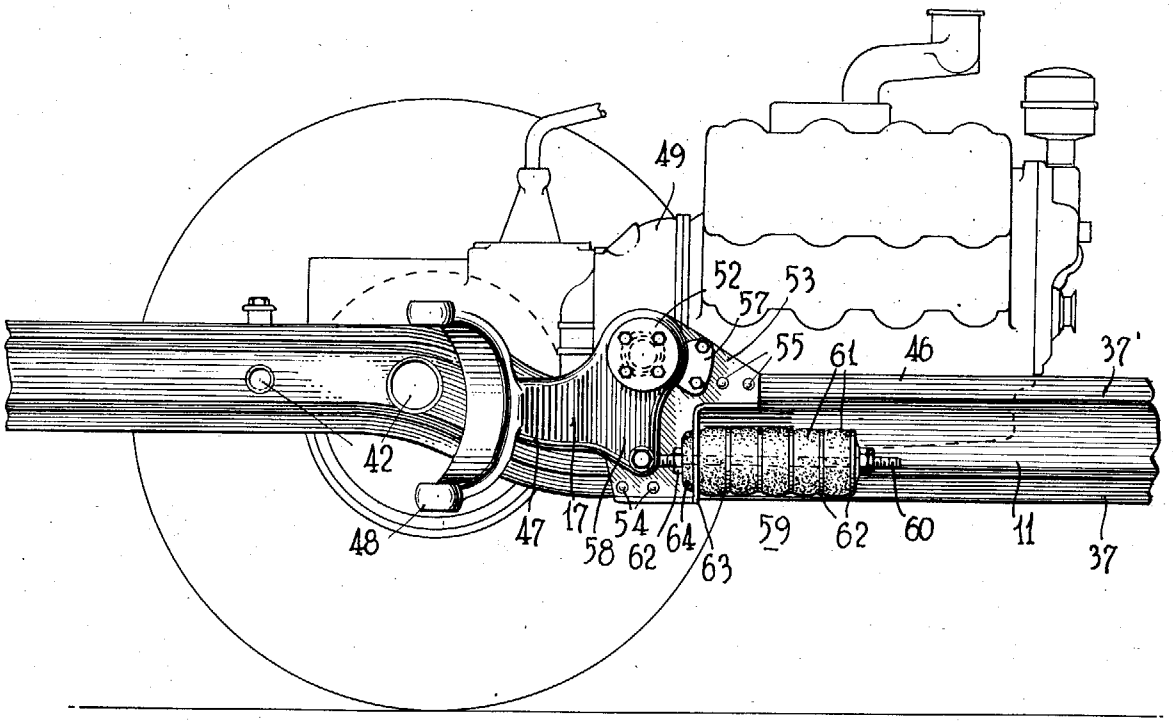
Fig. 7 is a side elevation showing the wheel unit suspension in co-operative relation with the chassis.
Figure 8:
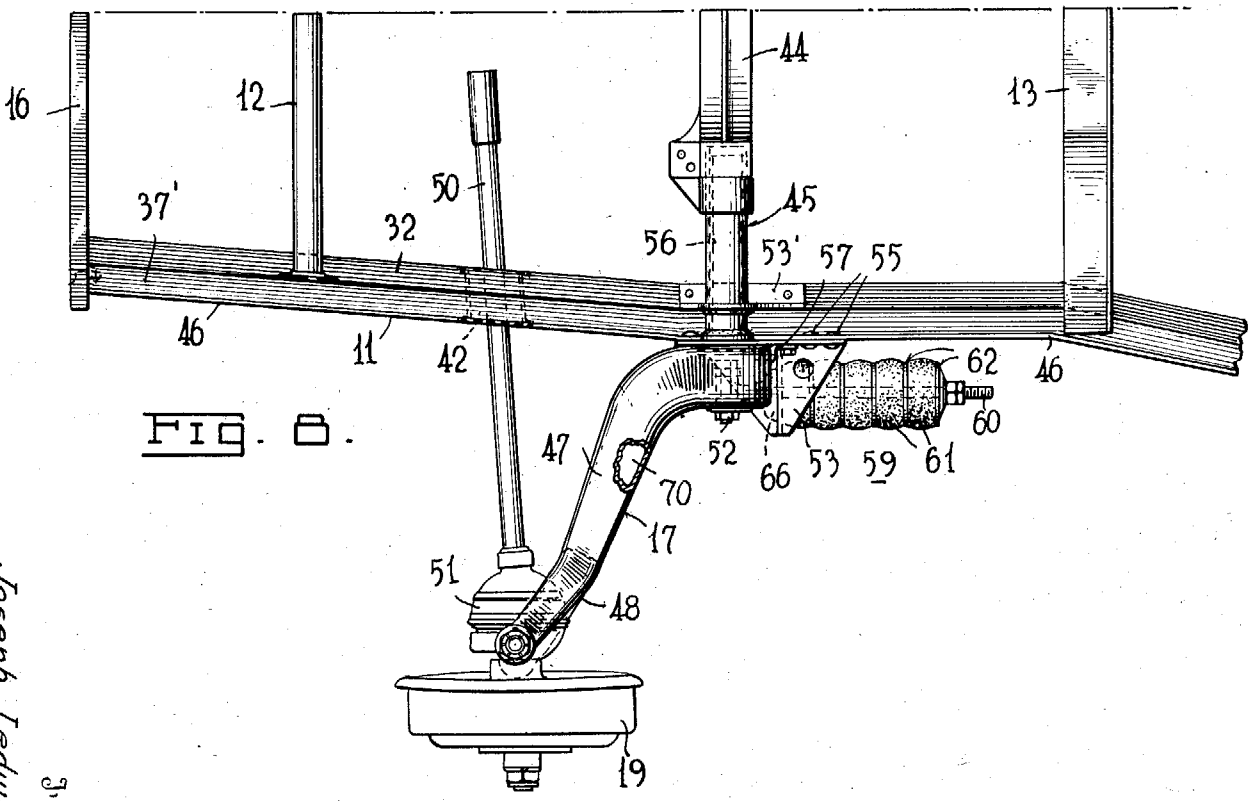
Fig. 8 is a partial plan of the chassis and wheel unit suspension.

The wheel unit supporting arms 17 are of substantially tubular sheet metal construction as shown at 70, forming a bell crank, the two arms 47 and 58 thereof being integral, one of the said arms 47 being radially offset and extending angularly outwardly from the chassis and terminating in a bifurcated end portion 48, arranged for the reception and retention of a spindle upon which the front wheels pivot in steering. Power from the motor 49 is transmitted to these front wheels through a drive shaft 50 passing through the opening 42 of the side sill to drive the wheels by means of a universal joint 51. The wheel unit support is pivoted about an axis 52 appreciably above the top surface of the side sill. This is accomplished by means of a stub shaft or trunnion 56 secured to the wheel support and journaled in bearings in the tubular portion 45 of the cross-member 44, 45. This tubular portion at each side of the vehicle is itself welded or otherwise rigidly secured to inner and outer brackets 53′ and 53, the latter being firmly attached to the upper and lower outer flanges 36 and 46 of the side sill by means of bolts or rivets 54 and 55, as best shown in Fig. 7, these flanges being of multiple thickness, as above described, and thus affording a secure anchorage. The wheel unit support is held in place by means of a suitable retainer 57, removable from the outside of the chassis. In this manner the entire unit may be replaced independently of the other parts.

The other arm 58 of the bell crank is arranged to have a pivotal connection with a resilient member 59. This member comprises primarily a center rod 60 having a plurality of resilient elements or toroids 61 mounted thereon under compression, with metallic discs 62 interposed between them, one group being disposed longitudinally at one side of an outwardly extending arm 63 of the bracket 53, and one or more resilient members 64 at the opposite side thereof, providing respectively a substitute for the springs generally used, and for the usual shock absorbing device.

Figure 2:
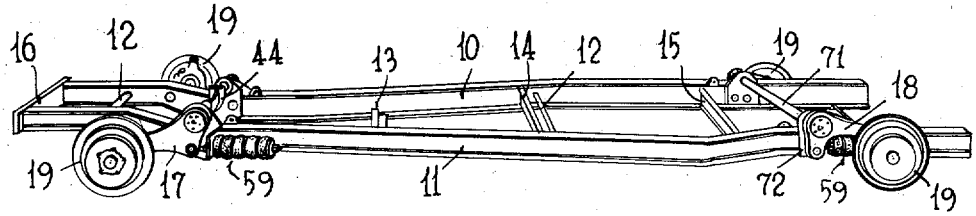
Fig. 2 is a side perspective of the same.

At the opposite end of the vehicle a similarly functioning construction is used but wherein the wheel unit supporting arms are of slightly different form as shown at 18 in Fig. 2. In this instance the bearing member corresponding to the member 45 at the opposite end of the vehicle is here a continuous tubular member 71 extending transversely across the entire chassis width, and rigidly secured to brackets 72, also firmly attached to the outer multiple thickness flanges of the side sills, as described in connection with the member 44, 45. Likewise the pivoting of the wheel units above the chassis plane allows an underslung chassis construction, giving a much lower center of gravity while at the same time allowing a resilient means 59 to be disposed longitudinally in substantial parallel relation to the chassis sill at a point avoiding any undesirable outside obstrusiveness of these parts.

By means of this sheet metal construction of box section a structure of great strength is provided without the enormous weight consequent to solid structures of the same dimension. A vehicle constructed in this manner has very desirable riding qualities and is not subject to many of the disadvantages found in previous structures.

I aim to cover in the appended claims all modifications within the true spirit and scope of my invention, and although necessarily limited in terminology to some definite descriptive words, it is not intended to thereby unduly restrict or limit the invention.

What I claim is:

1. An automobile chassis sill of closed polygonal cross section comprised of a multiple number of longitudinally extending stampings joined together by lapped flanges located exteriorly of the closed section and characterized by a substantially vertical disposition of one of said joints at the upper outer edge of the section and the disposition of another of said joints substantially horizontally at the lower inner edge of said section.

2. An automobile chassis sill according to claim 1 in which a topmost substantially horizontal wall of the cross section immediately adjoins the substantially vertically disposed exterior lapped joint and a substantially vertically disposed inner wall of the cross section adjoins the substantially horizontally disposed lapped joint.

3. An automobile chassis sill according to claim 1 in which the polygonal cross section is substantially rectangular and the bottom wall of the section is joined to the outer wall by an exterior lapped joint substantially vertically disposed at the lower outer extremity of the cross section.

4. An automobile chassis sill having opposed side walls connected together at intervals by channel cross section braces extending from top to bottom of the cross section spot welded to both sides from the side walls of the channels, one of the top and bottom walls of the cross section being constituted a separate element from the remaining walls and joined thereto by externally made joints, whereby the said braces may be introduced between the side walls and spot welded in place and the said externally joined wall thereafter applied to close the cross section.

5. An automobile chassis sill having opposed side walls connected together at intervals by channel cross section braces extending from top to bottom of the cross section spot welded to both sides from the side walls of the channels, one of the top and bottom walls of the cross section being constituted a separate element from the remaining walls and joined thereto by externally made joints, whereby the said braces may be introduced between the side walls and spot welded in place and the said externally joined wall thereafter applied to close the cross section, the said channel sectioned internal braces being arranged in the form of a Warren trussing and having their channel cross sections presenting toward the said externally joined wall.

6. A sheet metal automobile side sill of box section comprising an inner member of generally Z-section having a vertically deep web and outwardly and inwardly extending portions respectively at top and bottom thereof, and a member overlapping and secured to said bottom portion and forming therewith an inwardly extending seat of at least double thickness, said second named member extending outwardly of the said web for substantially the width of said top portion, and said second member and top portion each being formed with a marginal flange, and an outer member closing the channel formed by said first-named members and secured to the marginal flanges thereof.

7. A sheet metal automobile side sill of box section comprising an inner member of generally Z-section having a deep vertical web, and top and bottom portions extending from said web respectively outwardly and inwardly thereof, a second member formed with an inwardly and upwardly facing angular portion nesting with the angle formed by the web and bottom portion of the Z of said first member and secured to the bottom portion to form therewith a seat of at least double thickness, said second member having an outer marginal flange spaced laterally from the web of the first member by substantially the width of the upper portion of said first member, and an outer member closing the channel formed by said first-named members and overlapping the top portion of said first member, and the marginal flange of the second member and secured thereto.

8. A sheet metal automobile side sill according to claim 7, in which the marginal flange of the second element is turned downwardly.

9. A sheet metal automobile side sill of box section comprising an inner member of substantially Z-section having a deep vertical web, and outwardly and inwardly extending portions respectively at the top and bottom thereof, a lower member overlapping the inwardly extending portion at the bottom of said web and secured thereto to form at least a double thickness seat, said member extending outwardly some distance beyond the web to form with the first-named member a channel section, and an outer member closing the mouth of the channel and secured to said lower member and top arm of said Z-section member to complete the box section structure.

10. A sheet metal automobile side sill according to claim 9, in which the upper portion of the Z-section member and the outer margin of the lower member are flanged vertically and the outer closing member is secured to said flanges.

11. A sheet metal automobile side sill of box section according to claim 9, in which the top portion of the Z-section member and the outer margin of the lower member are vertically flanged in opposite directions and the outer closing member is secured to said flanges.

12. A sheet metal automobile side sill according to claim 9, in which the lower member is vertically flanged at its outer margin and the outer closing member is secured to said flange at the bottom, and at the top overlaps the top portion of the Z-section member and is secured thereto.

13. A sheet metal automobile side sill according to claim 9, in which the lower member is flanged downwardly at its outer margin, and the closing member is secured to said downwardly extending flange.

14. A sheet metal automobile side sill of box section comprising an inner member of substantially Z-section having a deep vertical web and horizontal portions extending in opposite directions at the top and bottom thereof, a second member overlapping one horizontal portion of the Z-section member and secured thereto, said second member extending outwardly of the said web for substantially the width of the other horizontal portion, and an outer member closing the channel formed by said first-named members and secured thereto to complete the box section structure.

15. A sheet metal automobile side sill according to claim 14 in which the second member and last mentioned horizontal portion of the Z-section member are each formed with a marginal flange, and the outer closing member is secured to said flanges.

16. A sheet metal automobile side sill according to claim 14 in which the second member and last mentioned horizontal portion of the Z-section member are each formed with a marginal vertically extending flange, and the outer closing member is secured to said flanges.

17. A sheet metal automobile side sill according to claim 14 in which the outer margins of the second member and last mentioned horizontal portion of the Z-section member are flanged vertically in opposite directions, and the outer closing member is secured to said flanges.

18. A sheet metal automobile side sill having angularly disposed walls forming a structure of closed box section and comprising a member of substantially Z-section having a deep vertical web and outwardly and inwardly extending portions respectively at the top and bottom thereof, and the outwardly extending portion being formed with a vertical marginal flange, said web constituting a side wall of said box section structure, and said flanged portion constituting at least a part of the top wall, the remaining walls being secured to said flange and to said inwardly extending portion of the Z-section member.

19. A sheet metal automobile side sill of box section comprising an inner member having a deep vertical web and horizontal portions at the top and bottom thereof, a second member overlapping one horizontal portion of the inner member and secured thereto, said second member extending outwardly of the said web for substantially the width of the other horizontal portion, and said second member and last mentioned horizontal portion each being formed with a vertical marginal flange, and an outer member closing the channel formed by said first named members and secured to said marginal flanges to complete the box section structure.

20. A rigid automobile frame comprising sheet metal side sills of closed box section having flanges of multiple thickness projecting from opposite edges of one wall of the box structure and lying substantially in the plane of said wall, and a cross member extending between said side sills, and means connecting said cross member to each of said side sills comprising a bracket rigidly attached to said cross member and secured directly to both of said flanges of multiple thickness.

21. A rigid automobile frame comprising sheet metal side sills of closed box section having flanges of multiple thickness projecting from opposite edges of one wall of the box structure and lying substantially in the plane of said wall, and a cross-member extending between said side walls and having tubular end portions, and means connecting said cross member to each of said side sills comprising a bracket rigid with the tubular portion of said cross member and secured directly to both of said flanges of multiple thickness.

JOSEPH LEDWINKA.